United States Patent [19]

Gillett et al.

[11] Patent Number: 5,267,281
[45] Date of Patent: Nov. 30, 1993

[54] HEAT EXCHANGER AND WATER TANK ARRANGEMENT FOR PASSIVE COOLING SYSTEM

[75] Inventors: James E. Gillett, Greensburg; F. Thomas Johnson, Baldwin Boro; Richard S. Orr, Pittsburgh; Terry L. Schulz, Murrysville Boro, all of Pa.

[73] Assignee: Westinghouse Electric Corp., Pittsburgh, Pa.

[21] Appl. No.: 790,296

[22] Filed: Nov. 8, 1991

[51] Int. Cl.⁵ .............................................. G21C 15/18
[52] U.S. Cl. .................................... 376/282; 376/283; 376/293; 376/298; 376/299
[58] Field of Search ............... 376/282, 283, 293, 298, 376/299

[56] References Cited

U.S. PATENT DOCUMENTS

| | | | |
|---|---|---|---|
| H119 | 9/1986 | Keeton et al. | 376/299 |
| 3,127,322 | 3/1964 | Dodd | 176/38 |
| 3,718,539 | 2/1973 | West et al. | 176/37 |
| 4,239,596 | 12/1980 | Bevilacqua et al. | 176/37 |
| 4,322,267 | 3/1982 | Kinoshita et al. | 376/216 |
| 4,678,626 | 7/1987 | Germer | 376/298 |
| 4,753,771 | 6/1988 | Conway et al. | 376/282 |
| 4,830,815 | 5/1989 | Glutz | 376/299 |
| 5,021,211 | 6/1991 | Gould et al. | 422/129 |

OTHER PUBLICATIONS

M. M. Corletti et al., Transactions of the American Nuclear Society, vol. 62, pp. 669–671, (1990).

*Primary Examiner*—Donald P. Walsh
*Assistant Examiner*—Frederick H. Voss
*Attorney, Agent, or Firm*—J. C. Valentine

[57] ABSTRACT

A water storage tank in the coolant water loop of a nuclear reactor contains a tubular heat exchanger. The heat exchanger has tubesheets mounted to the tank connections so that the tubesheets and tubes may be readily inspected and repaired. Preferably, the tubes extend from the tubesheets on a square pitch and then on a rectangular pitch therebetween. Also, the heat exchanger is supported by a frame so that the tank wall is not required to support all of its weight.

15 Claims, 4 Drawing Sheets

HEAT EXCHANGER AND WATER TANK ARRANGEMENT FOR PASSIVE COOLING SYSTEM

This invention was developed in the course of U.S. Department of Energy Contract DE-AC03-90SF18495.

BACKGROUND

This invention relates to water-water tubular heat exchangers in nuclear reactor coolant loops and, more particularly, to heat exchangers designed to transfer core decay heat from nuclear reactors during postulated events where there is a loss of cooling capability via steam generators in the coolant loops of pressurized water reactors. The present invention is particularly useful in passive systems designed to cool a nuclear reactor by natural convection alone.

U.S. Pat. No. 4,753,771 to Conway et al. discloses a well designed passive safety system for a pressurized water nuclear reactor which employs a water-water residual heat removal heat exchanger for removing core decay heat from a reactor core by natural convection. In the Conway et al. passive system, the heat exchanger is disposed in an in-containment reactor water storage tank. The heat exchanger is hydraulically connected via piping to the hot leg and the cold leg of the primary water circuit for cooling the reactor core. In an event of a system failure where, e.g., the coolant pump fails, the coolant water naturally circulates from the reactor core via a pipe through the heat exchanger and then back to the core via another pipe. As disclosed by Convay et al., the heat exchanger generally comprises a plurality of tubes extending from an inlet manifold to an outlet manifold located in the storage tank. Thus, the residual heat removal heat exchanger transfer the decay heat to the water in the storage water tank.

Ideally, a residual heat removal heat exchanger such as the disclosed heat exchanger will rarely, if ever, be needed and the other systems of the plant will perform normally. Nevertheless, residual heat removal heat exchangers contain contaminated primary coolant water at reactor system pressures and, therefore, must be periodically inspected and repaired, if necessary.

Although the heat exchanger disclosed by Conway et al. performs its safety function well, other operational concerns such as routine maintenance and repair of such an exchanger may penalize the on stream operation of the plant. For example, a simple inspection of the tube normally requires that the storage tank be drained before the inspection. However, these tanks are very large (having areas of up to 2000 square feet or more and heights of up to 30 feet or more) and may require many hours to drain. In draining that tank, the removal of the reactor vessel may also be required and thereby further extend the shutdown. Also, this design may have difficulty showing acceptable tank loads following the rupture of the pipe leading to or from the heat exchanger but inside the tank.

SUMMARY OF THE INVENTION

It is an object of the present invention to provide a residual heat removal heat exchanger in a water storage tank in a coolant circuit of a nuclear reactor which may be more readily inspected and repaired than can current designs. It is a further object of the present invention to provide a heat exchanger which may be readily inspected or repaired from outside the water storage tank. Another objective of the invention is to move all of the large connecting pipes outside of the tank.

With these objects in view, the present invention resides in a water-water tubular heat exchanger disposed in a water storage tank for transferring core decay heat from the nuclear reactor to water in the storage tank. The tank has two spaced apart tank connections which define openings. The heat exchanger has a plurality of tubes disposed in the tank. The tubes extend from tubesheet assemblies adjacent the tank connections.

In a preferred embodiment of the invention, the tubes are spaced on a pitch at the tubesheet which minimizes the diameter of the tubesheets so that the tubesheet thicknesses may be minimized (design thickness being a function of diameter at a design pressure) and the portions of the tubes between the tube ends are spaced on another pitch which facilitates natural circulation in the tank. Thus, the tubes preferably extend from the tubesheets on a square pitch and then on a rectangular pitch along much of the tubes. Preferably,, the tubes are C-shaped and are supported independently of the tank wall.

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED EMBODIMENT

Figure 1:
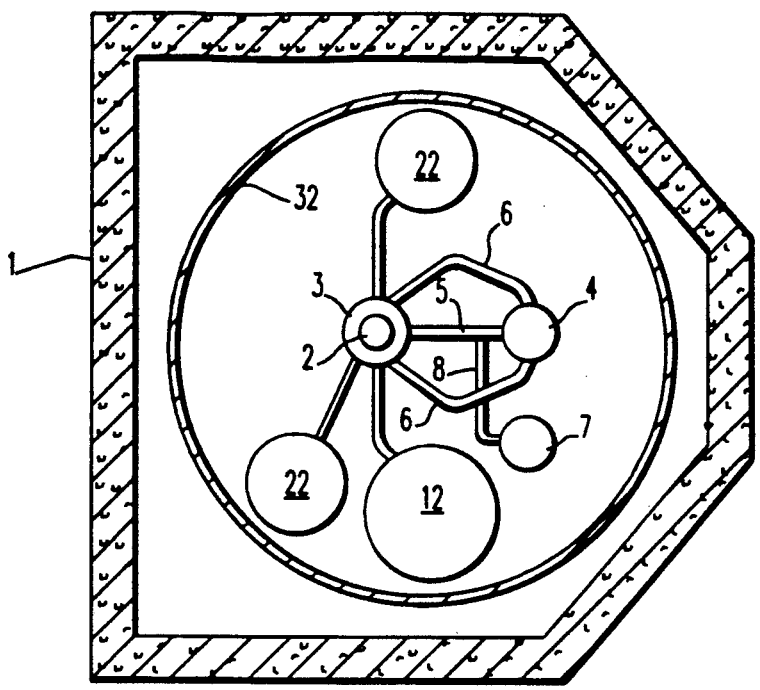
FIG. 1 is a schematic top plan view of a pressurized water nuclear reactor with which the present invention may be employed.

Turning to FIG. 1, there is schematically illustrated a shield building I and cylindrical metal containment shell 32 in horizontal section, showing the principal components of a pressurized water nuclear reactor system with which the present invention may be employed. A reactor core 2 accommodated in a reactor vessel 3 continuously heats water 2 circulating in a primary water circuit forming part of the rector cooling system. The water heated in the reactor core 2 is supplied to a steam generator 4 through a hot leg 5 of the loop piping of the primary water circuit. The hot leg 5 extends from the reactor vessel 3 to the steam generator 4 in which heat is taken out by the water circulating in a secondary water circuit (not shown). After the heat exchange in the steam generator 4 water is withdrawn therefrom through the cold leg 6 of the loop piping of the primary water circuit and is reintroduced into the reactor vessel 3. A pressurizer 7 communicating with the hot leg 5 by means of a pipe 8 maintains the required pressure in the primary coolant circuit.

Figure 2:
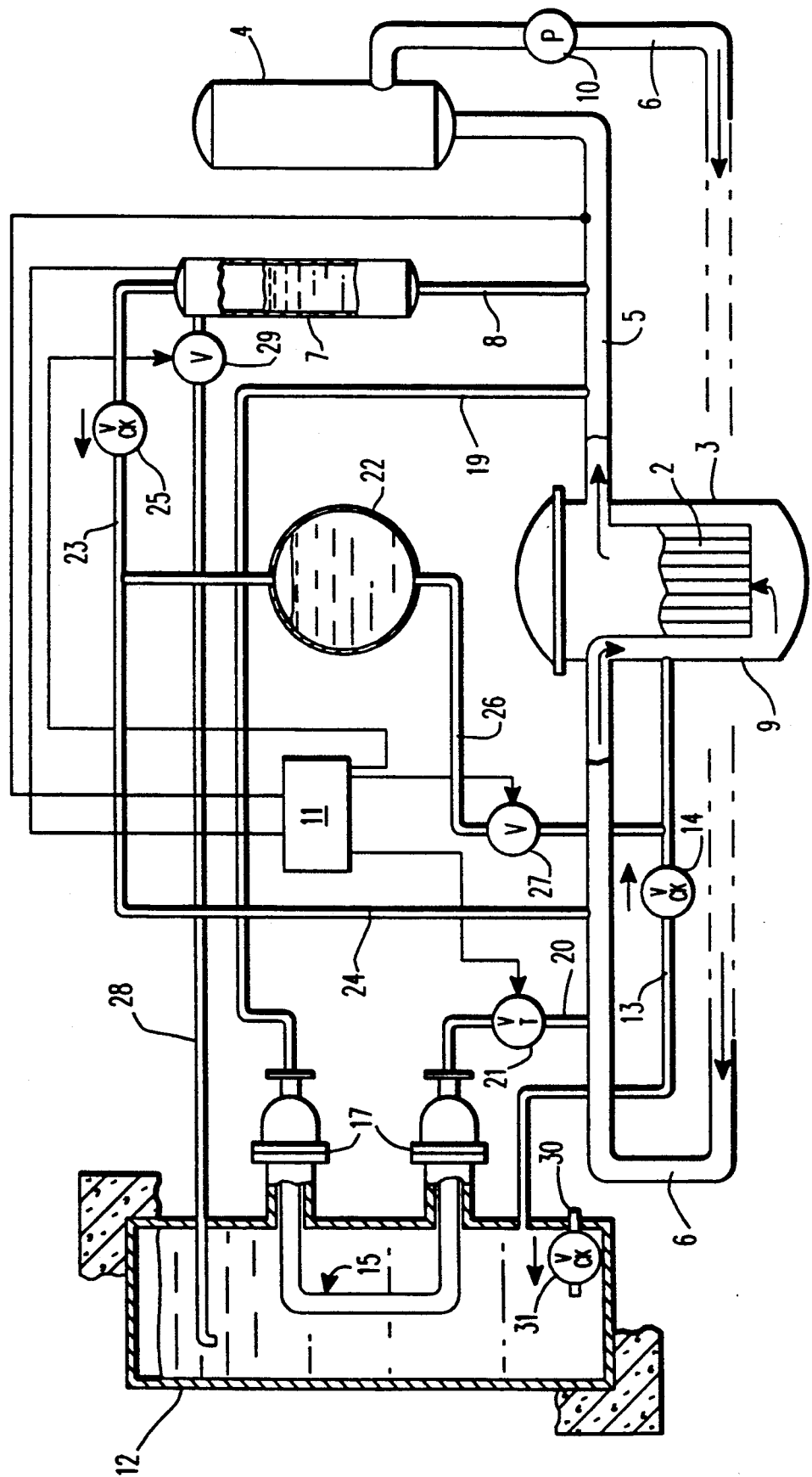
FIG. 2 is a schematic diagrammatic view of the pressurized water nuclear reactor of FIG. 1 which shows the preferred embodiment of the present invention.

Also referring to FIG. 2, as the water enters the reactor vessel 3 from the cold leg 6, it is directed downwardly within the reactor vessel 3 to flow to the bottom thereof through a downcomer 9. Therefrom the water is forced upwardly through the reactor core 2 and it eventually leaves the reactor vessel 3 in a heated condition through the hot leg 5 as described above. The water in the primary circuit (that is, the reactor coolant system) is maintained in circulation by reactor coolant pumps 10 (only one shown).

The above-specified reactor components, their arrangement and operation are well known. Also conventionally, parameters such as temperatures, water levels, pressures, etc. in and along the various components are routinely sensed in a continuous manner by known sensor and recording and/or display systems. Such conventional parameter sensing systems are symbolically designated at 11.

An in-containment water storage tank 12 is situated in the shield building I such that a substantial portion of its volume is situated above the level of the reactor coolant system piping, that is, above the height level of the hot leg 5, the cold leg 6 and the water path within the reactor vessel 3. Preferably, the storage tank has a full ceiling with a vent. Also, it may be shielded with 24 to 30 inches of concrete. Equipment hatches in the ceiling (not shown) may be employed to replace equipment in the tank. The tank may have any convenient regular or irregular shape which fits in the containment area.

The storage tank 12 may be connected within the downcomer 9 of the reactor vessel 3 by a pipe 13 maintained closed by a check valve 14 as long as smaller pressure prevails at the tank side of the check valve 14 than at its downcomer side.

The in-containment water storage tank 12 accommodates one or more passive residual heat removal heat exchangers of the present invention, one of which is generally designated at 15. As shown, the heat exchanger may have tubesheet headers 17 which extend beyond the tank wall. The headers may be recessed in the tank wall to utilize less containment area. The heat exchanger 15 is normally totally submerged in the water stored in the storage tank 12 and is situated at an elevation above the coolant loop piping of the reactor. The cold water in the storage tank 12 thus functions, with respect to the heat exchanger 15, as an initial heat sink.

The heat exchanger 15 may be connected with the hot leg 5 of the reactor cooling system by a pipe 19 and with the cold leg 6 by a downwardly extending pipe 20. The pipe 20 may be blocked by a normally closed, fail-open throttle valve 21. Valve 21 provides the capability for regulating the flow rate through the pipe 20, for example, from the parameter sensing systems 11.

Above the height level of the reactor coolant system piping 5 and 6, there may be provided two spherical core make-up tanks 22 (both shown in FIG. 1, but only one shown in FIG. 2). The pipe connections pertaining to only one of the core make-up tanks 22 will be described, while it is understood that identical duplicate piping may be used for the other core make-up tank 22 to provide for a redundancy.

The top of the inside space of the cold water filled core make-up tank 22 may communicate with the steam space of the pressurizer 7 by means of a relatively small-diameter pipe 23. Further, the upper space of the core make-up tank 22 may be connected with the cold leg 6 by a pipe 24 of relatively large diameter. A check valve 25 may be arranged in the pipe 23 for preventing flow of fluid through the pipe 23 in the direction of the pressurizer 7. The bottom of the core make-up tank may be connected with the downcomer 9 of the reactor vessel 3 by a pipe 26 which is normally closed by means of a fail-open isolation valve 27.

From the steam space of the pressurizer 7 there may extend a depressurizing pipe 28 which opens into the in-containment water storage tank 12 and which is maintained normally closed by a power operated pressure relief valve 29.

The in-containment water storage tank 12 may at its lower part, be provided with an outlet nipple 30 which is normally maintained closed by a check valve 31 which prevents outflow of water from the in-containment water storage tank 12 but permits water flow from the flooded containment into the storage tank 12.

U.S. Pat. No. 4,753,771 to Conway et al. is hereby incorporated by reference for its disclosure of the operation of such a system.

Figure 3:
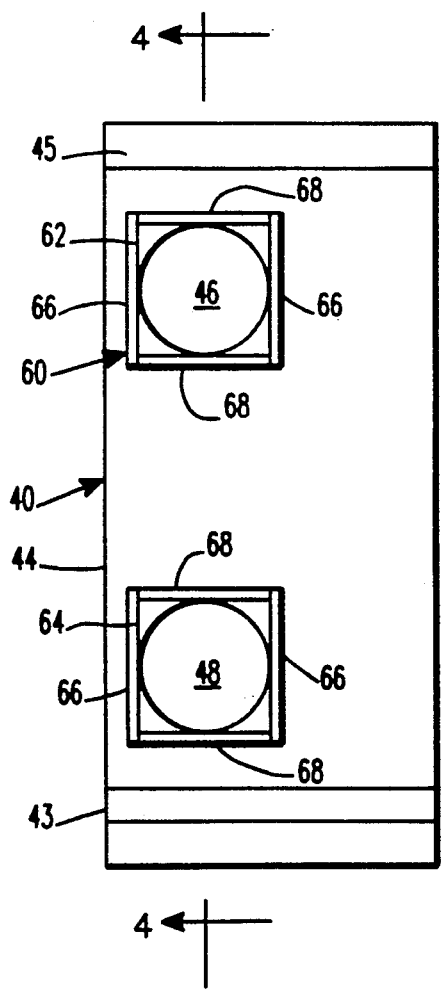
FIG. 3 is a elevation of a water storage tank with which a heat exchanger embodying the present invention may be employed.

FIG. 3 generally shows an in-containment water storage tank 40 at floor level 43 with which the present invention may be employed. The storage tank 40 generally comprises a metal liner 42 (shown in FIG. 4) supported by a honeycomb structure 44. The liner 42 is preferably a stainless steel composition for resisting corrosive action of the water and is about ⅛ to ¼ inch thick. The supporting honeycomb structure 44 preferably includes conventional structural steel supports (not shown) embedded in concrete shielding having a thickness of about 24 to 30 inches. The tank 40 may also have a concrete ceiling 45 which covers the entire tank 40 with vent (not shown). Preferably, the embedded structural steel is designed to support the entire tank 40 load and the concrete provides a safety factor. Alternatively, the in-containment storage tank may not have a concrete shield in other designs.

The storage tank 40 will have various tank connections (as is discussed above in connection with FIG. 1), including an inlet connection 46 and an outlet connection 48 for permitting communication between the primary coolant water circuit and inlet and outlet tubesheet assemblies 50 and 52 (best seen in FIG. 6) of a heat exchanger 58 assembly (shown in FIG. 2) embodying the present invention. Any suitable tank design may be employed. FIG. 5 shows a preferred design wherein the inlet connection 46 and the outlet connection 48 may be generally defined as openings in mounting plates 62 and 64, respectively. The mounting plates 62 and 64 are supported by a pair of vertical T-shaped members 66 and horizontal T-shaped members 68. This supporting assembly 60 may be bolted or welded together. This assembly preferably is not part of the embedded structural steel supporting the tank liner 42, although it may be in other embodiments. As is indicated in FIG. 4 by welds 70, the mounting plates 62 and 64 are welded to the tank liner 42.

Figure 6:
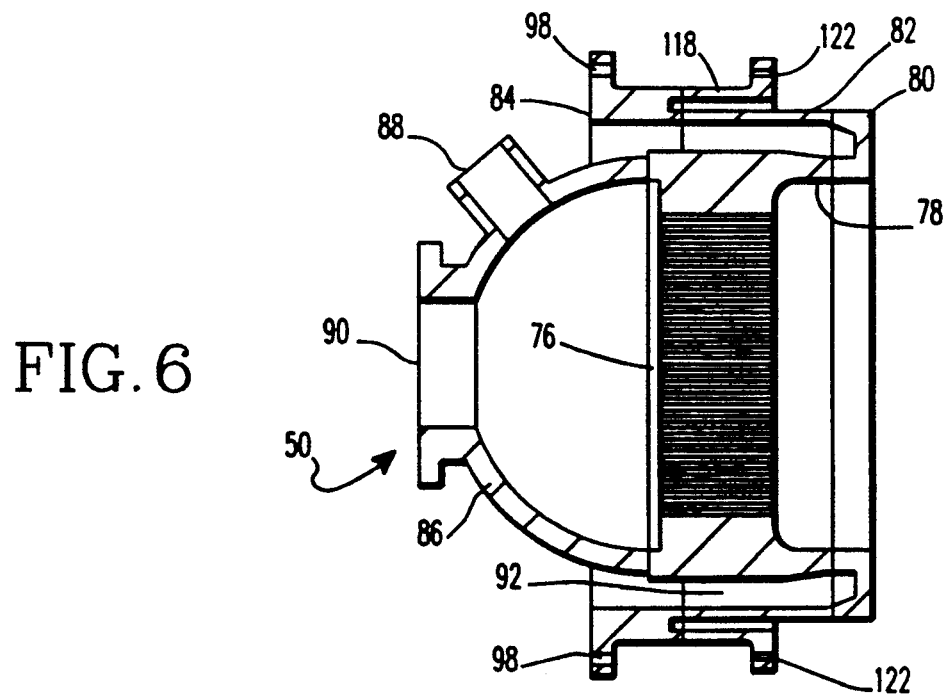
FIG. 6 is a section view of a tubesheet assembly shown in FIG. 4.

The tubesheet assemblies 50 and 52 are best shown in FIG. 6, which illustratively shows assembly 50. The assembly 50 shown is particularly designed to withstand thermal stresses due to 600° F. inlet primary water and 70° F. tank water and high transient pressures. The assembly 50 generally comprises a circular tubesheet member 76 having a skirt portion 78 extending therefrom to a U-flange extension ring 80 which defines a reverse bend. An extension ring 82 extends from the U-flange extension ring 80 to a mounting ring 84. These components of the tubesheet assemblies 50 and 52 are welded together to form unitary structures. In addition, an inlet channel head 86 having a primary water inlet connection 88 and an access manway 90 is welded to the tubesheet 76. In a preferred embodiment, the inlet connection 88 is located near the top of the header 86 to vent the assembly 50. The configuration of the assembly 50 generally defines an annulus 92 between the outer periphery of the tubesheet 76 (and skirt portion 78) and the inner periphery of the extension ring 82. The outlet tubesheet assembly 52 is generally similar to the inlet assembly 50, having an outlet channel head 94 with an outlet connection 95.

Figure 4:
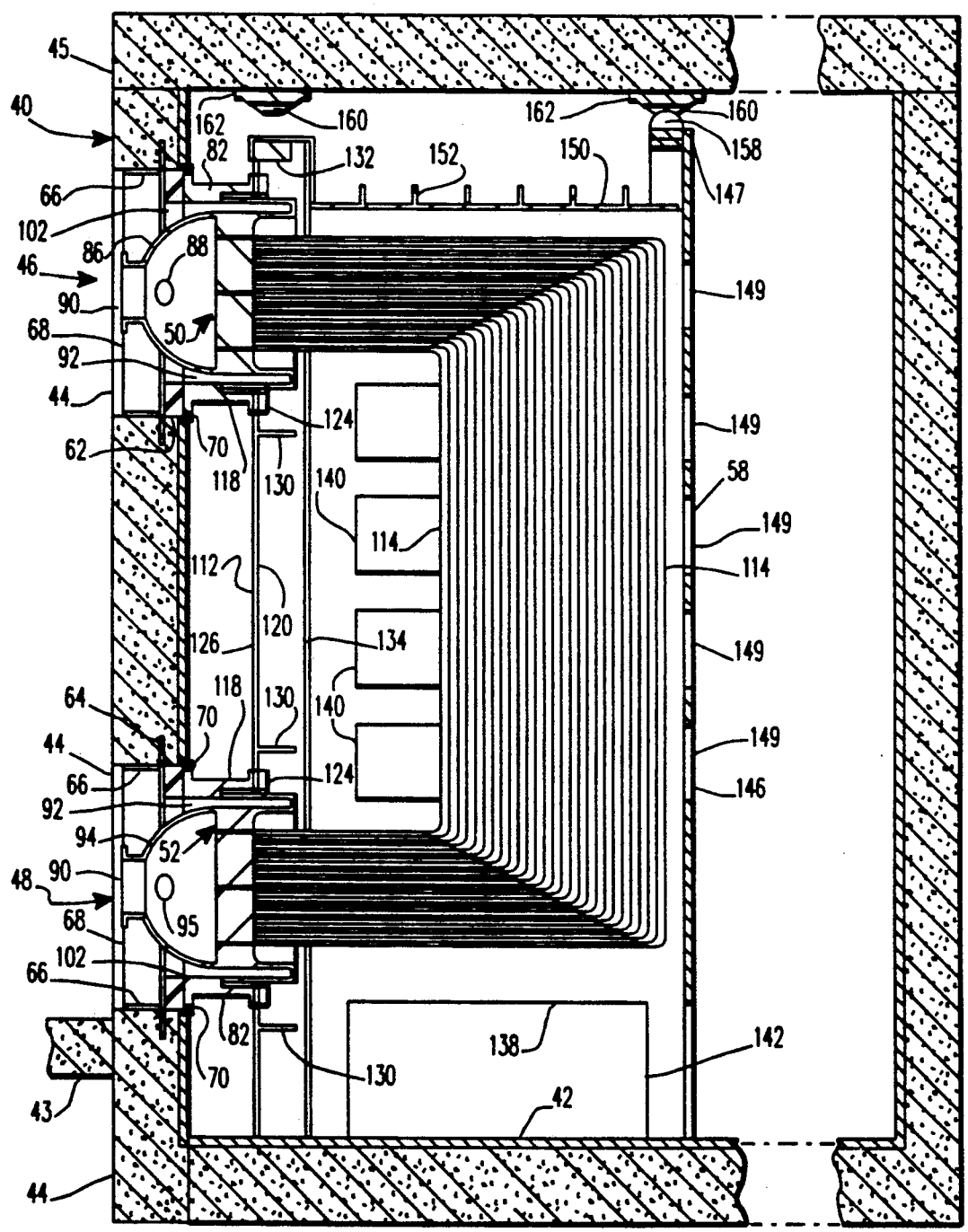
FIG. 4 is a sectional elevation of the water storage tank of FIG. 3 taken along section line 4—4, including a heat exchanger which is a preferred embodiment of the present invention.
Figure 5:
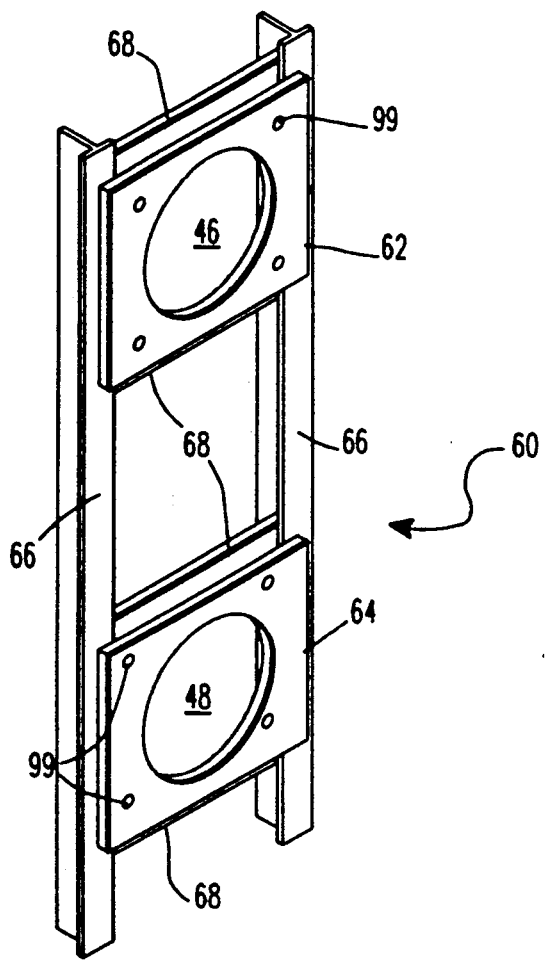
FIG. 5 is an isometric view of structural support for the tank connections shown in FIG. 4.

As is shown in FIG. 4, the tubesheet assembly mounting rings 82 are adjacent inner surfaces of the mounting plates 62 and 64. Preferably,, the rings 82 are attached to the mounting plates 62 and 64 by bolts (not shown) extending through ring bolt holes 98 (shown in FIG. 6) and into blind bolt holes 99 (four holes being shown in FIG. 5) in the plates 62 and 64. Advantageously, canopy or omega welds 102 between the plates 62 and 64 and the rings 82 may be made and inspected from the general containment area outside the tank 40. Also, these welds will not be exposed to high temperatures of the primary water because the water in the storage tank 40 absorbs a substantial amount of heat from the back of the tubesheet 76 and the tubesheet skirt portion 78. Thus, the mounting plates 62 and 64 and the rings 82 will remain at the tank temperature, i.e., normally about 70° F., under all thermal conditions. In addition, the mounting bolts extending through holes 98 and 99 adjacent the welds 70 will be maintained at a substantially constant temperature and will not tend to loosen during thermal cycling conditions. Accordingly, high pressure transients against the face of the inlet tubesheet 50 are effectively absorbed by the support structure 60. Further, conventional flange seals (not shown) may be employed between the plates 62 and 64 and the rings 84.

Preferably, the weight of the tubesheet assemblies 50 and 52 are supported by a heat exchanger support structure 112 which generally supports the weight of tubes 114 extending between the assemblies 50 and 52. Thus, housing mounts 118 may be welded to the tubesheet mounting rings 84 (as may be seen in FIG. 6) and mounted to the front housing member 120 of the support structure 112 by bolts (not shown) extending through-bolt 122 of the housing mounts 118 to bolt holes in a reinforcing ring 124 disposed on the back side of the front housing member 120 opposite the mounts 118. The front housing member 120 shown in FIG. 4 generally comprises a heavy plate 126 having rearwardly extending U-shaped end portions 134 (when seen in a plan view) which is stiffened by horizontal members 130 and a top brace 132.

The heat exchanger support structure 112 of FIG. 4 also comprises side housing members 138 extending from the front housing member 120 on both sides of the bundle of heat exchanger tubes 114. The side housing members 138 are shown as plates having large openings 140 and 142 which permit natural circulation of the water in the storage tank 40. Alternatively, these members 138 may be tubular or other known structural members which may be welded or bolted to the front housing member 120. A rear housing member 146 having a top brace 147 extends between the side housing members 138. The rear housing member 146 also has large openings 149 and 151 for permitting natural circulation of the tank water. In embodiments where spargers (not shown) are employed in the tank 40, the rear housing member 146 may be baffled to prevent steam impingement on the tubes 114. A top housing member 150 having upstanding ribs 152 is supported on the side housing members 138. The top housing member 150 generally covers the tubes 114 and substantially limits steaming from the surface of the tank water (which generally varies in the region between the tubes 114 and the top structural member 150) and humidification of the containment area.

As is shown in FIG. 4, the upper portions of the front housing member 120 and the back support member 146 extend above the top member 150. This elevated structure supports upward projections (represented by projection 158 on the back member 146) which align with slots (represented by slots 160) in ceiling mounted lateral alignment supports 162. This arrangement laterally supports the heat exchanger support structure 112 against lateral thrusts.

The heat exchanger tubes 114 are designed to naturally circulate the water in the tank 40. Thus, the primary water inlet 88 is substantially higher than the primary water outlet 95 in order to create a buoyant force in the primary water circuit. Accordingly, the tubes 114 may have a vertical height of up to about twenty feet or more. Preferably, the inlet connection 46 and the outlet connection 48 are disposed in a vertical plane. As is shown, the tubes 114 horizontally extend from the tubesheets sheets 50 and 52 and then bend to form a central vertically extending portion therebetween. Preferably, the tubes 114 form a "C" shape as shown in order to permit the use of fixed tubesheets while permitting the tubes to expand. Also, such a configuration will minimize the number of tube shapes and bends. In one design, only about twenty seven slightly different ¾ inch tube profiles having slightly different shapes and bend radii were required to meet rigorous cooling requirements. Other tube shapes and dimensions may be employed in other embodiments depending upon the design conditions. In other embodiments, the tubes may be L-shaped or J-shaped with one tubesheet adjacent a tank connection in a sidewall and a second tubesheet adjacent a tank connection in a tank roof or floor.

The heat exchanger 58 may be fabricated using the same techniques as are employed to fabricate steam generators. Thus, the tubes 114 may be supported by hangers (not shown) suspended from the top support member 150 between the ribs 152. Also, they may be maintained in place by horizontal rods (not shown) extending between the side housing members 138. Other support structures may be employed. The primary purpose for supporting the tubes 114 is to maintain a known geometry during any event that the heat exchanger 58 may be required to meet. These events may include seismic events and sparger activation. The support of the tubes 114 for flow induced vibration and wear is less of a concern than for more typical heat exchangers because of the short time of operation and relatively low velocities on the tankside of the heat exchanger 58.

Preferably, the tubes 114 have a pitch (i.e., the center to center distance of adjacent tubes) which minimizes the diameter of the tubesheets 50 and 52 so that the tubesheet thicknesses may be minimized. However, a small pitch may retard the natural circulation of storage water in the tank 40 past the tubes 114. Thus, the vertical portions of the tubes 114 may be disposed on a different pitch designed to facilitate natural circulation in certain embodiments of the present invention. In a preferred embodiment where ¾ inch C-shaped tubes are employed, the portions of the tubes 114 adjacent the tubesheets 50 and 52 are disposed on a 1.5 inch square pitch and the intermediate vertical portions of the tubes 54 are disposed on a 1.5 inch by 3.0 inch rectangular pitch. The change in pitch may be arranged in the transition bends from the horizontal to the vertical portions by extending the incremental horizontal lengths of the adjacent tube rows.

Advantageously, tube differential expansion between the hot tubes 114 and the cold tank temperature of the tube support structure 112 may be accommodated by elastic deformation of the C-shapes. In addition, the location of vertical lateral supports and horizontal lengths of the tubes 114 may be designed to control the bending stresses to acceptable levels. Thus the vertical support spacing and horizontal tube lengths should be at least about forty inches for ¾ inch diameter tubes in order to accept a potential maximum temperature differential of 530° F. (600° F. maximum design process pressure less 70° F. ambient). Other suitable tubular arrangements may be employed in other embodiments to satisfy other design requirements.

Advantageously, the through wall tubesheet design eliminates large diameter, high pressure, reactor coolant lines (such as the pipes 19 and 20 shown in FIG. 1). Thus, the pipe 19 of FIG. 1 may be welded to the exchanger inlet 88 and the pipe 20 may be welded to the exchanger outlet 95. Accordingly, the possibility of a large pipe rupture introducing large amounts of energy into the storage tank 40 is eliminated. The rupture of a ¾ inch exchanger tube (which can be readily plugged) would introduce much less kinetic energy into the water in a storage tank, which could be easily absorbed.

While a present preferred embodiment of the present invention has been shown and described, it is to be understood that the invention may be otherwise variously embodied within the scope of the following claims of invention.

We claim:

1. In a coolant water loop of a nuclear reactor, a water-water tubular heat exchanger disposed in a water storage tank for transferring reactor decay heat to water in the storage tank, wherein:
   a tank has two apart tank connections defining openings;
   a heat exchanger extending into the tank openings has a plurality of tubes disposed in the tank extending from two tubesheet assemblies; and
   the tubesheet assemblies are disposed adjacent the tank connections.

2. The heat exchanger of claim 1, wherein the plurality of tubes extending from the tubesheet assemblies define a C shape.

3. The heat exchanger of claim 2, wherein the tank connections are disposed in a vertical plane.

4. In a coolant water loop of a nuclear reactor, a water-water tubular heat exchanger disposed in a water storage tank for transferring reactor decay heat to water in the storage tank, wherein:
   a tank has two spaced apart tank connections defining openings;
   a heat exchanger has a plurality of tubes disposed in the tank extending from two tubesheet assemblies, wherein the tubes have a portion arranged on one pitch and another portion arranged on another pitch; and
   the tubesheet assemblies are disposed adjacent the tank connections.

5. The heat exchanger of claim 4, wherein the tubes extend from the tubesheet assemblies on a square pitch and extend therebetween on a rectangular pitch.

6. The heat exchanger of claim 1, wherein the spaced apart tubesheet assemblies are seal welded to the tank connections.

7. The heat exchanger of claim 1, further comprising a frame means supported by the tank floor and spaced from the tank connections for supporting the weight of the tubes and the tubesheet assemblies mounted to the tank connections.

8. The heat exchanger of claim 1, wherein the tubesheet assemblies have skirts disposed between tubesheets and the tank connections.

9. The heat exchanger of claim 8, wherein the tubesheet skirts extend from the tubesheets peripherally of the tubes to a reverse bend and then peripherally of the tubesheets to the tank connections.

10. The heat exchanger of claim 1, further comprising channel heads welded to the tubesheet assemblies and in hydraulic communication with a coolant water loop of a nuclear reactor, and access means in the headers for inspecting tubesheets and tubes in the tubesheets without draining the storage tank.

11. The heat exchanger of claim 1, wherein the channel heads are in fluid flow communication with a coolant water loop of a nuclear reactor.

12. The heat exchanger of claim 4, wherein the spaced apart tubesheet assemblies are seal welded to the tank connections.

13. The heat exchanger of claim 4, further comprising a frame means supported by the tank floor and spaced from the tank connections for supporting the weight of the tubes and the tubesheet assemblies disposed adjacent to the tank connections.

14. The heat exchanger of claim 4, wherein the tubesheet assemblies have skirts disposed between tubesheets and the tank connections.

15. The heat exchanger of claim 14, wherein the tubesheet skirts extend from the tubesheets peripherally of the tubes to a reverse bend and then peripherally of the tubesheets to the tank connections.

* * * * *